United States Patent Office

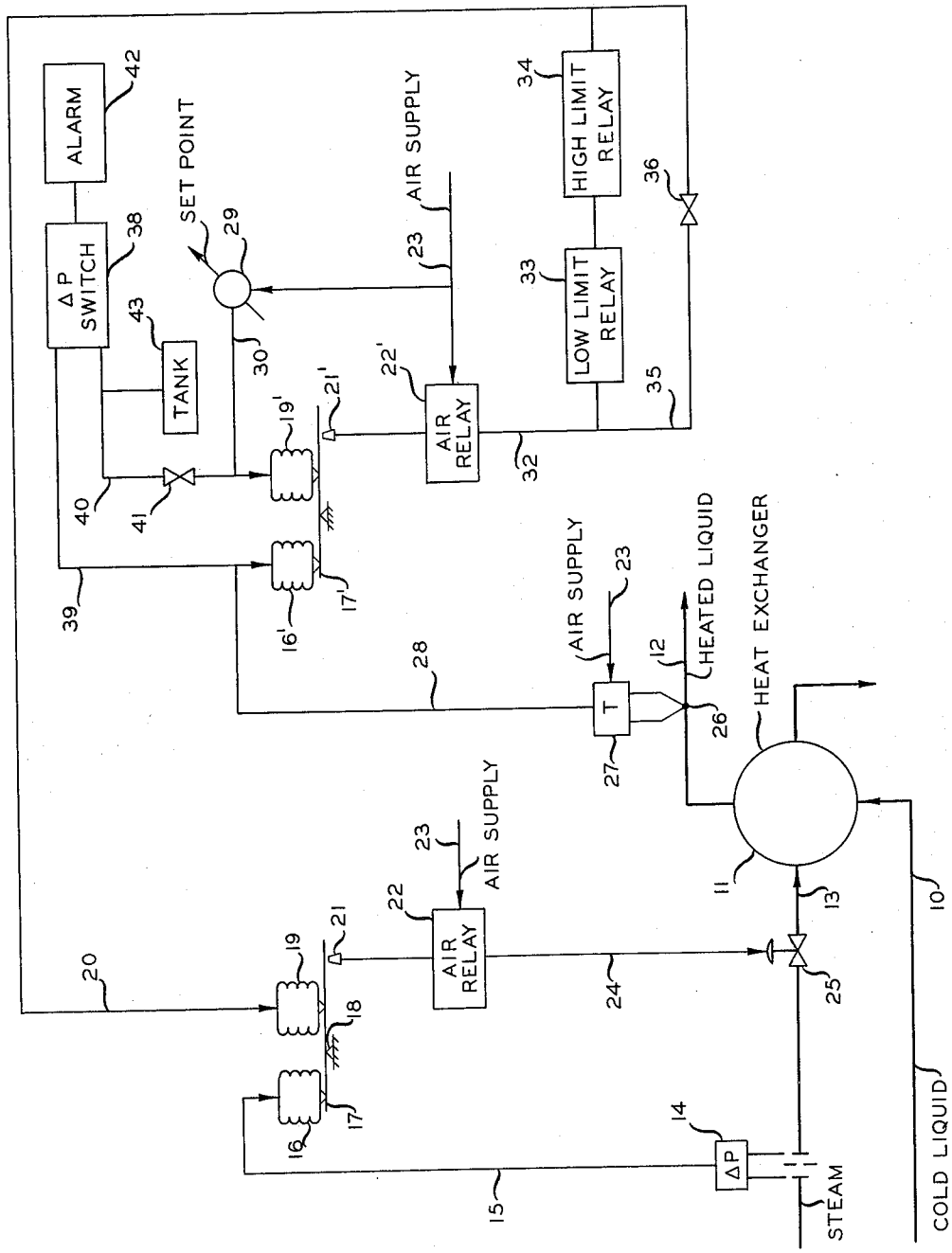

3,237,634
Patented Mar. 1, 1966

3,237,634
PROCESS CONTROL SYSTEM
Theodore W. Colby, Jr., Old Ocean, Tex., assignor to
Phillips Petroleum Company, a corporation of Delaware
Filed Feb. 8, 1963, Ser. No. 257,273
6 Claims. (Cl. 137—82)

This invention relates to apparatus for maintaining the output signal of a controller within predetermined limits. In another aspect it relates to warning systems for process controllers to indicate severe fluctuations of measured conditions.

Automatic controllers are employed extensively in industrial operations to maintain selected variables constant or within predetermined limits. For example, in the chemical and petroleum industries, numerous automatic control systems have been developed which adjust process conditions in response to measurements of variables such as temperature, pressure, flow, liquid level, pH, density, composition and the like. These control systems commonly employ either a pneumatic or an electrical controller which establishes a signal representative of the variable being measured. This signal, in turn, automatically adjusts a condition which affects the operation of the process.

In automatic control systems, the possibility always exists that a malfunction of the measuring instrument or controller may result in a serious process upset unless some type of limit control is provided. In accordance with one aspect of this invention, a process controller is provided with a pair of limiting means through which the output control signal is transmitted. One of these limiting means prevents the control signal from exceeding a first preselected value, and the other limiting means prevents the control signal from falling below a second preselected value.

In some automatic control systems, it is possible that the measured variable may deviate substantially from a desired value due to some upset in the process. An indication of such a deviation is often desirable in order for an operator to determine the reason for the upset and to permit the operator to take appropriate steps to correct the matter. In accordance with another aspect of this invention, a system is provided for indicating deviations of the measured variable beyond a preselected limit. A first signal representative of the measured variable is transmitted to a differential signal indicating device. The second signal transmitted to this indicating device represents the set point of the control instrument. Thus, whenever the measured variable deviates from the desired set point by a preselected amount, the differential measuring device provides an output signal which can actuate an alarm. Additionally, a delay means is provided in the connection between the set point of the differential measuring device and the alarm to prevent actuation of the alarm when adjustments of the set point are made.

Accordingly, it is an object of this invention to provide a system for maintaining the output signal of a controller within predetermined limits.

Another object is to provide a warning system for a process controller to indicate severe fluctuations of measured conditions.

Other objects, advantages and features of the invention should become apparent from the following detailed description.

The drawing is a schematic representation of an embodiment of the control system of this invention which utilizes pneumatic components.

The drawing illustrates the control system of this invention being employed to regulate the heating of a liquid, merely by way of example. Cold liquid to be heated is introduced through a conduit 10 which communicates with a heat exchanger 11. Heated liquid is removed through a conduit 12. Steam, or other heating medium, is introduced through a conduit 13 which communicates with heat exchanger 11. A differential pressure transmitter 14 is connected across an orifice in conduit 13 to provide an output signal which is representative of the rate of flow of steam through conduit 13. This output signal is transmitted by means of a conduit 15 to a first bellows 16. An increase in pressure in bellows 16 tends to expand the bellows to rotate a plate 17 in a counterclockwise direction about a fulcrum 18. A set point pressure is applied to a second bellows 19 through a conduit 20. Bellows 19 is positioned on the opposite side of the fulcrum so that an increase in pressure in bellows 19 tends to rotate plate 17 in a clockwise direction. One end of plate 17 is positioned adjacent a nozzle 21 to regulate the rate at which air can escape through the nozzle. Air under pressure is introduced into an air relay 22 from a supply conduit 23. A control pressure, representative of the rate at which air escapes from nozzle 21, is transmitted from relay 22 through a conduit 24 to a control valve 25 in conduit 13.

The control apparatus thus far described forms a conventional flow controller to tend to maintain a predermined rate of flow through conduit 13. Any time the actual measured flow deviates from the desired set point flow, as represented by the pressure in conduit 20, a signal is transmitted to valve 25 to adjust the valve in such a manner as to return the actual flow to the desired value. Such a system tends to supply a uniform quantity of heat to the liquid introduced through conduit 10.

The remainder of the control system illustrated in the drawing is provided to maintain the temperature of the heated liquid in conduit 12 constant at a preselected value even though other variables in the system may vary. To this end, a temperature measuring device 26 is disposed in conduit 12. A temperature transducer 27 establishes an output pneumatic pressure in a conduit 28 that is representative of the temperature of the heated liquid in conduit 12. This pressure is transmitted to a second bellows 16'. A set point transducer 29, which is an adjustable pressure regulator, in an air supply conduit 23 establishes a pneumatic pressure in a conduit 30 which is representative of the desired temperature of the liquid in conduit 12. This pressure is transmitted to bellows 19'. The two pressures in bellows 16' and 19' are compared by means of rotatable plate 17' which adjusts the opening of nozzle 21. An output pressure is thus established in a conduit 32 which represents deviations of the measured temperature from the desired set point temperature. This air pressure is transmitted through a low limit relay 33 and a high limit relay 34 to bellows 19 to form the set point signal of the flow controller previously described. In this manner, the flow of steam through conduit 13 is adjusted to tend to maintain the measured temperature in conduit constant at a preselected value.

Low and high limit relays 33 and 34 are provided as a safety feature. These relays prevent the pressure transmitted to bellows 19 from deviating outside a preselected range. Such a deviation could occur, for example, due to a malfunction of the temperature transmitter or the first described controller. These two limit relays can be pneumatic devices known in the art for limiting transmitted pressures. A bypass conduit 35, having a valve 36 therein, is connected around the two limit relays to permit adjustment of the controller system independently of these relays, when desired.

As previously mentioned, it is desirable to have an indication of any severe fluctuation of the measured temperature. This is provided by transmitting the pressure in conduit 28 (measured temperature) to the first input of a differential pressure switch 38 by means of a conduit 39. A conduit 40, having an adjustable valve 41 therein, connects conduit 30 to the second input of switch 38. Differential pressure switch 38 provides an output signal to an alarm 42 whenever the difference between the two input pressures applied thereto exceeds a preselected value. A tank 43 is connected to conduit 40 downstream of valve 41. Valve 41 and tank 43 thus provide a delay means to prevent sudden fluctuations of pressure in conduit 30 from actuating the alarm. This delay means is desirable to prevent the alarm from being actuated when set point transmitter 29 is adjusted by an operator. Differential pressure switch 38 is constructed so as to measure pressure differentials greater than a preselected amount, regardless of which of the input pressures is the larger.

This invention has been described in conjunction with a temperature control system in order to simplify the explanation. However, it is applicable to almost any type of automatic control system. The invention is particularly useful when rapid fluctuations of the measured variable are likely to occur or when the measuring instrument is not entirely reliable in operation. While pneumatic control elements have been described, it should be evident that other types of control equipment, such as electrical, can be employed. In an electrical system, elements 41 and 43 can comprise a resistor and a capacitor, respectively. It should also be apparent that more complex controllers can be employed. For example, controllers having integral or derivative modes can be used.

While the invention has been described in conjunction with presently preferred embodiments, it obviously is not limited thereto.

What is claimed is:

1. In a process control system having input means adapted to receive a first signal representative of a measured quantity, set point means to establish a second signal of preselected magnitude, and first means to compare said first and second signals and establish an output signal representative of the difference therebetween; apparatus for indicating deviations of said first signal from said second signal which are greater than a preselected amount comprising second means to compare two input signals and establish a warning signal when the difference between the two input signals exceeds a preselected amount, means to connect said input means to one input of said second means to compare, means to apply said second signal to the second input of said second means to compare, and signal delay means included in said means to apply said second signal to the second input of said means to compare.

2. The apparatus of claim 1, further comprising first limit means connected to the output of said first means to compare to prevent said output signal from exceeding a first predetermined value, and second limit means connected to the output of said first means to compare to prevent said output signal from becoming less than a second predetermined value which is less than said first predetermined value.

3. A process control system having an inlet port adapted to receive a first pneumatic pressure representative of a measured quantity, set point means to establish a second pneumatic pressure of preselected magnitude, and first means connected to said port and said set point means to compare said first and second pressures and establish an output signal representative of the difference therebetween; apparatus for indicating deviations of said first pressure from said second pressure which are greater than a preselected amount comprising a second means to compare two input pressures and establish a warning signal when the difference between the two input pressures exceeds a preselected amount, first conduit means connecting said inlet port to one input of said second means to compare, second conduit means to transmit said second pressure to the second input of said second means to compare, restriction means in said second conduit means to limit flow therethrough, and fluid storage means connected to said second conduit means between said restriction means and said second means to compare.

4. The apparatus of claim 3, further comprising first limit means connected to the output of said first means to compare to prevent said output pressure from exceeding a first predetermined value, and second means connected to the output of said first means to compare to prevent said output pressure from becoming less than a second predetermined value which is less than said first predetermined value.

5. In a process control system having input means adapted to receive a first signal representative of a measured quantity, set point means to establish a second signal of preselected magnitude, and first means to compare said first and second signals and establish an output signal representative of the difference therebetween; apparatus for indicating deviations of said first signal from said second signal which are greater than a preselected amount comprising second means to compare two input signals and establish a warning signal when the difference between the two input signals exceeds a preselected amount, means to connect said input means to one input of said second means to compare, means to apply said second signal to the second input of said second means to compare, signal delay means included in said means to apply said second signal to the second input of said means to compare, first limit means connected to the output of said first means to compare to prevent said output signal from exceeding a first predetermined value, and second limit means connected to the output of said first means to compare to prevent said output signal from becoming less than a second predetermined value which is less than said first predetermined value.

6. A process control system having an inlet port adapted to receive a first pneumatic pressure representative of a measured quantity, set point means to establish a second pneumatic pressure of preselected magnitude, and first means connected to said port and said set point means to compare said first and second pressures and establish an output signal representative of the difference therebetween; apparatus for indicating deviations of said first pressure from said second pressure which are greater than a preselected amount comprising a second means to compare two input pressures and establish a warning signal when the difference between the two input pressures exceeds a preselected amount, first conduit means connecting said inlet port to one input of said second means to compare, second conduit means to transmit said second pressure to the second input of said second means to compare, restriction means in said second conduit means to limit flow therethrough, fluid storage means connected to said second conduit means between said restriction means and said second means to compare, first limit means connected to the output of said first means to compare to prevent said output pressure from exceeding a first predetermined value, and second means connected to the output of said first means to compare to prevent said output pressure from becoming less than a second predetermined value which is less than said first predetermined value.

References Cited by the Examiner

UNITED STATES PATENTS

| | | | |
|---|---|---|---|
| 2,939,472 | 6/1960 | Eller | 137—82 |
| 2,973,772 | 3/1961 | Oglesby | 137—82 |

ISADOR WEIL, *Primary Examiner.*